Oct. 27, 1959 O. E. PETERSEN 2,910,528

BURST CONTROL OF COLOR TELEVISION RECEIVER BANDWIDTH

Filed Dec. 1, 1955 2 Sheets-Sheet 1

INVENTOR.
Ove E. Petersen
BY Mueller & Aichele
Attys.

BURST CONTROL OF COLOR TELEVISION RECEIVER BANDWIDTH

Filed Dec. 1, 1955 2 Sheets-Sheet 2

INVENTOR.
Ove E. Petersen
BY Mueller & Aichele
Attys.

2,910,528
Patented Oct. 27, 1959

2,910,528

BURST CONTROL OF COLOR TELEVISION RECEIVER BANDWIDTH

Ove E. Petersen, Glen Ellyn, Ill., assignor to Motorola, Inc., Chicago, Ill., a corporation of Illinois Application December 1, 1955, Serial No. 550,311
10 Claims. (Cl. 178—5.4)

The present invention relates to color television and more particularly to an improved color television receiver for utilizing a present-day monochrome television signal of standardized composition as well as the present-day standardized color television signal.

The color television signal as presently standardized includes a main carrier amplitude modulated by the brightness or luminance information, and it also includes a chroma subcarrier modulated on the main carrier and which is phase and amplitude modulated by coloring or chroma information. Even though the chroma subcarrier in accord with the theory of frequency interlace, has been given a selected frequency (3.58 megacycles) so related to the line scanning frequency that it and its sidebands theoretically should cause no interference in the brightness channel of the receiver, this subcarrier has been found in actual practice to interfere to an appreciable extent in the brightness channel and to appear on the viewing screen of the color picture tube as a criss-cross pattern. This has necessitated the use of a trap for the chroma subcarrier in the brightness or luminance amplifier circuit. However, the chroma subcarrier and its side bands cover a frequency band of approximately 2.5–4.0 megacycles, and a trap designed to prevent such a band from being translated by the brightness amplifier so limits the band-pass of that amplifier that inferior operation of the receiver results when the receiver is tuned to utilize a monochrome television signal. In other words, when the brightness or video amplifier is designed to prevent the chroma subcarrier and its side bands of a received color television signal from producing interference patterns on the screen of the color picture tube, the response of this amplifier for a monochrome television signal is so limited that inferior black and white reproduction results.

The dot composition of the color picture tube is such that there is a maximum video frequency that can be reproduced thereon without the production of murray interference patterns. With most present day tubes this maximum video frequency is in the vicinity of 4.0 megacycles. Therefore, for optimum black and white reproduction, the video amplifier should pass frequencies up to 4.0 megacycles and it is undesirable for it to pass higher frequencies because the picture tube tends to produce interference patterns in response to such higher frequencies for the reasons discussed above. However, for color reproduction, the video amplifier should trap the 3.5–4.0 megacycle chroma subcarrier and its side bands. In brief, the video amplifier should have an upper cutoff frequency of around 3.5 megacycles for color reproduction and around 4.0 megacycles for optimum monochrome reproduction. Present day color television receivers usually compromise between these values so that they do not produce the best possible color picture or the best possible monochrome picture of which the picture tube is capable.

It is an object of the present invention to provide an improved color television receiver in which the brightness channel is controlled to translate the maximum band width of brightness signal for monochrome reproduction that the picture tube is capable of handling, and of translating the maximum band width of the brightness signal for color reproduction yet trapping the chroma subcarrier and its side bands.

A feature of the invention is the provision of an improved color television receiver in which the band pass of the video or brightness amplifier is automatically controlled to have a selected value during the reception of a color television signal so as to trap the chroma subcarrier and its side bands, and to have another value during the reception of a monochrome television signal to translate sufficient signal information for optimum monochrome reproduction of which the color picture tube is capable.

The above and other features of the invention which are believed to be new are set forth with particularity in the appended claims. The invention itself, however, together with further objects and advantages thereof, may best be understood by reference to the following description when taken in conjunction with the accompanying drawing in which:

The invention is intended to be used in a television receiver for selectively utilizing a monochrome television signal and a color television signal. The monochrome television signal includes brightness components extending through a predetermined frequency range; and the color television signal includes brightness frequency signal extending through at least a portion of the predetermined frequency range, and it further includes a chroma subcarrier of a selected frequency within the frequency range. The receiver includes a color image reproducing device, a brightness channel for translating the brightness components of the monochrome television signal and the brightness components of the color television signal to the reproducing device, and a chroma channel for translating the chroma information modulated on the chroma subcarrier to the reproducing device.

The invention includes the combination of a signal translating circuit included in the brightness channel and having a selected band pass for translating at least a portion of the brightness components of the color television signal to the reproducing device during reception of the color television signal, and for trapping the chroma subcarrier and its sidebands. A controlled source is provided for producing a control signal having a first value during the reception of the color television signal and having a second value during the reception of the monochrome television signal. And a control means is coupled to the translating circuit and is responsive to the control signal for changing the band pass of the signal translating circuit during reception of the monochrome television signal to cause the translating circuit to pass the brightness components of the monochrome television signal over a greater frequency range than the brightness components of the color television signal.

Figures 1, 2, 3:
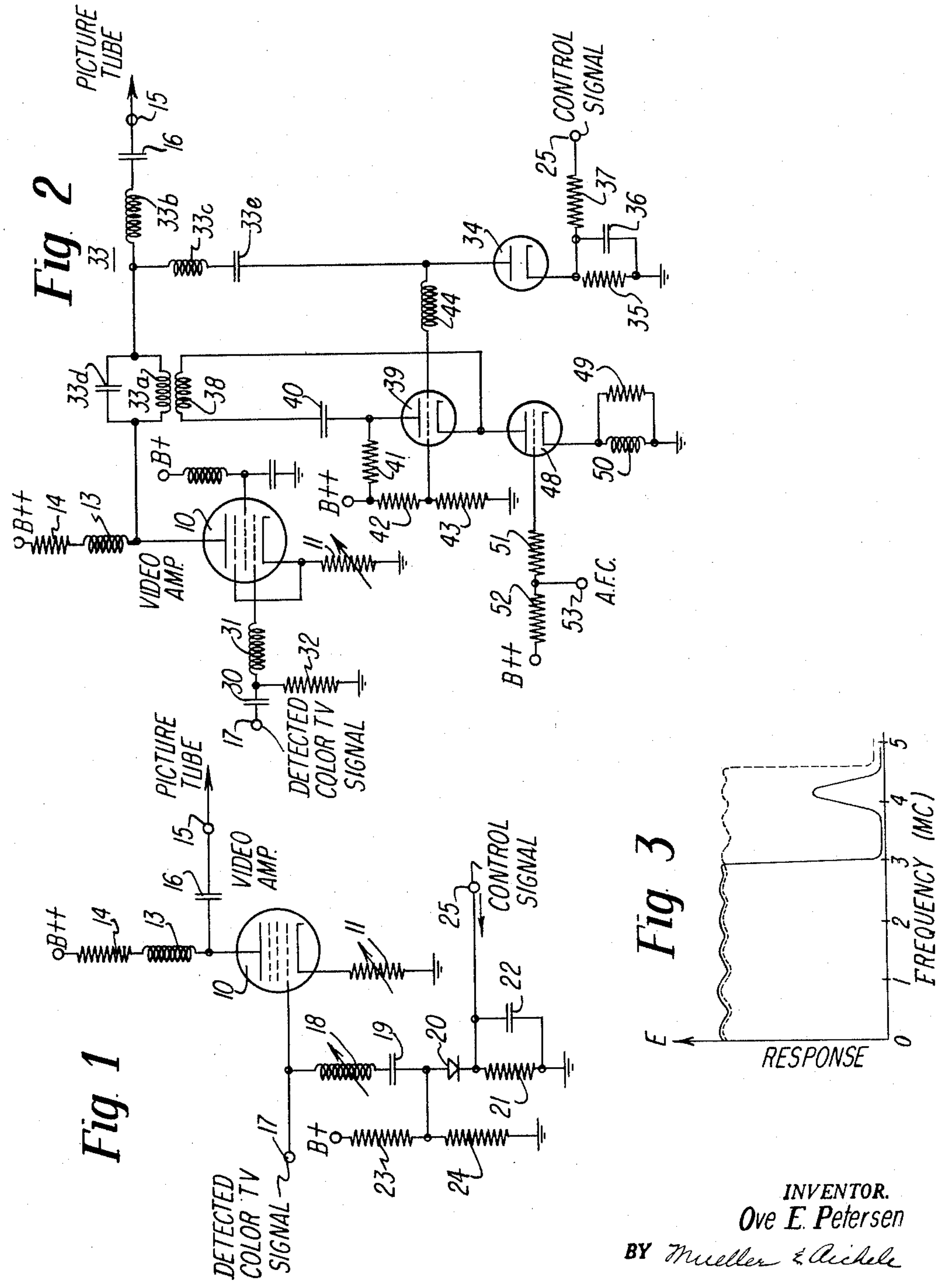
Figs. 1 and 2 are amplifier circuits controlled in accordance with the teaching of the present invention.
Fig. 3 shows the characteristic response curves of the circuit of Fig. 2.

The circuit of Fig. 1 is of a brightness or video amplifier circuit which may be included in the brightness or luminance channel of a color television receiver. A detected color television signal from the detector of the receiver is amplified in this amplifier and fed to the color picture tube or image reproducing device. In accordance with the present invention, the pass band of this amplifier is controlled to trap the chroma subcarrier and its side bands during color reproduction and to pass maximum usable video information during black and white or monochrome reproduction.

This amplifier circuit includes an electron discharge device 10 which may, for example, be a pentode of the type presently designated 12BY7. The cathode of device 10 is connected to ground through a variable resistor 11 which provides a manual contrast control. The anode of device 10 is connected to the positive terminal B+ of a source of unidirectional potential through a peaking coil 13 and resistor 14, and the anode is coupled to the output terminal 15 through a capacitor 16. The input terminal 17 is connected to the control grid of the device 10.

A series-resonant trap, circuit tuned to the frequency of the chroma subcarrier, including inductance coil 18 and capacitor 19, is connected to the grid of amplifier 10. The lower side of the trap circuit is connected to ground through a crystal 20 (or other type of diode) and through a series resistor 21, the resistor being shunted by a capacitor 22. The common junction of diode 20 and resistor 21 is connected to a positive potential source such as the junction of a pair of potentiometer resistors 23, 24 connected between the positive terminal B+ and ground. A control signal derived, for example, from the cathode of the band pass amplifier tube is impressed on terminal 25. This band pass amplifier tube is standard equipment in most present day color television receivers.

During the reception of a color television signal, the positive voltage at the cathode of the band pass amplifier tube is relatively low because the chroma subcarrier is impressed on the tube and biases it to a relatively low plate current. Therefore, during the reception of the color signal, the voltage from potentiometer 23, 24 overcomes the band pass amplifier cathode voltage on terminal 25 so that diode 20 conducts and trap circuit 18, 19 is effectively connected into the amplifier circuit to provide a low impedance path for the chroma subcarrier to ground. During the reception of the monochrome television signal, however, the cathode of the band pass amplifier may be manually adjusted to have a relatively high positive voltage. This positive voltage is impressed on terminal 25 and it is adjusted to be greater than the voltage from potentiometer 23, 24 so that diode 20 is blocked to cutoff. This effectively disconnects the trap 18, 19 and the amplifying device 10 can be designed to translate frequencies up to, for example, 4.0 megacycles when the trap is disconnected, for optimum monochrome reproduction.

A constructed embodiment of the circuit of Fig. 1 has worked satisfactorily for all practical purposes. However, most diodes presently available to constitute the diode 20 have a relatively high forward resistance (in the neighborhood, for example, of 300 ohms). This makes the quality factor (Q) of the trap 18, 19 fairly low when practical inductance and capacitance values are used for elements 18, 19. This presents a problem in providing an adequate trap for the 3.58 megacycle chroma subcarrier without at the same time unduly limiting the band pass of the amplifier. It would appear that the plate circuit of the device 10 is the proper place for the trap if the above difficulty is to be overcome, but this presents another problem in applying the control at the high D.C. level of the plate circuit for automatically connecting the trap in and out of the amplifier circuit without adversely affecting the video response of the amplifier when the trap is switched out of the circuit. A satisfactory solution for the latter problem is inherent in the circuit of Fig. 2.

In the circuit of Fig. 2, the device 10, as before, has its cathode connected to ground through a variable contrast control 11, and has its anode connected to the positive terminal B++ through a peaking coil 13 and a load resistor 14. The input terminal 17 is connected to the control grid through a coupling capacitor 30 and peaking coil 31, the common junction of the capacitor and coil being connected to ground through a resistor 32. The anode of device 10 is connected to the capacitor 16 through an M-derived constant-K filter 33 which is keyed in the manner to be described, to provide the desired control effect of the present invention. This filter includes a pair of series inductance coil 33*a*, 33*b* and a shunt inductance coil 33*c* connected to the common junction of the first two. The latter coil in conjunction with a capacitor 33*e* forms a series resonant trap tuned to the chroma subcarrier. A small condenser 33*d* connected across coil 33*a* and tuning the coil to the frequency of the chroma subcarrier was found to improve the frequency response of the amplifier during color reception.

In order to switch filter 33 in and out of the circuit, it is necessary to short out the inductance coil 33*a*, and to disconnect the trap 33*c*, 33*e* from ground. The control for trap 33*c*, 33*e* may be achieved in the same manner as in the circuit of Fig. 1 by a diode 34 connecting the lower side of this trap to ground through a series resistor 35, the series resistor being shunted by a capacitor 36. The junction of diode 34 and resistor 35 is connected to input terminal 25 which, as in the circuit of Fig. 1, receives the control voltage from the cathode of the band pass amplifier tube.

To effectively short out the coil 33*a*, an inductance coil 38 is closely coupled to the coil 33*a* and controllably short circuited. Coil 38 cannot be conveniently shorted by a controlled diode, because the diode would rectify the signal across the coil 33*a*, causing it to be undesirably biased by the D.C. voltage developed in the circuit. For that reason a grid-controlled tube such as triode device 39 is used, and whose anode is coupled through a capacitor 40 to one side of coil 38 and whose cathode is connected to the other side of that coil. The anode of device 39 is connected to the positive terminal B++ through a resistor 41, and the control grid of the device is connected to the common junction of a pair of potentiometer resistors 42, 43 connected between the positive terminal B++ and ground. The junction of resistors 42, 43 is also connected through a choke 44 to the junction of capacitor 33*e* and diode 34.

It is required that device 39 be rendered nonconductive and diode 34 conductive during the reception of the color television signal to eliminate the trapping effects of traps 33*a*, 33*d* and 33*c*, 33*e*. Device 34, may be controlled as previously noted in the same manner as the circuit of Fig. 1 by the derivation of a control signal from the cathode of the band pass amplifier tube and impressing this control signal on terminal 25. In the manner described previously, this effectively connects the trap 33*c*, 33*e* to ground during the reception of the color television signal and disconnects this trap during the reception of the monochrome signal. At the same time, triode 39 must be made nonconductive during the reception of the color signal so as to render trap 33*a*, 33*d* effective, and it must be made fully conductive during the reception of the monochrome signal so as to close the secondary circuit of coil 38 effectively short circuiting the primary circuit 33*a*, 33*d*.

For practical reasons, the plate resistance of triode 39 must be relatively low. A control voltage for actuating the triode may conveniently be derived from the AFC synchronizing circuit for the color oscillator which, like the band pass amplifier, also is standard equipment in most color receivers. In most color television receivers, a control voltage of 30 volts is developed across this AFC circuit when a color television signal is received and its color synchronizing bursts are impressed on the circuit; whereas the voltage drops to 10 volts during the reception of a monochrome signal that does not include the color synchronizing bursts. Because of the ratio between the resistance across coil 38 repersenting either the short circuit condition or the open circuit condition must be high, for example, of the order of 50:1, a large grid swing is required to control triode 39 between its cutoff and fully conducting condition. A triode of the type presently designated 12AT7 was chosen, and the impedance transformation between coils 33*a* and 38 was made of the order of 4 to 1.

It was found, however, in a constructed embodiment of the circuit of Fig. 2, that the control voltage developed at the AFC circuit was insufficient to drive the grid of triode 39 directly between the necessary limits to render the device fully conductive for one condition and fully cutoff for the other. Therefore, a second triode 48 is included in a D.C.-connected cascode arrangement with triode 39. The anode of triode 48 is directly connected to the cathode of triode 39, and the cathode of triode 48 is connected to ground through a resistor 49 shunted by a choke coil 50. A negative AFC voltage was used from the AFC synchronizing circuit for the color oscillator, and to raise the D.C. level of this voltage, the control electrode of tube 48 is connected to the positive terminal of B++ through a pair of series resistors 51, 52; with the AFC voltage being impressed on terminal 53 connected to the common junction of these last two resistors.

As shown by the solid line of Fig. 3, the M-derived filter 33 is designed to provide a sharp cutoff point in the neighborhood of 3.2 megacycles when its traps 33*a*, 33*d* and 33*c*, 33*e* are connected into the plate circuit of device 10. As shown by the dotted line of Fig. 3, the video amplifier 10 has a response extending to approximately 4.5 megacycles when the trap 33*a*, 33*d* of the filter is shorted by the short circuiting of secondary winding 38, by triode 38, and when the trap 33*c*, 33*e* is disconnected by diode 34.

During the reception of a color television signal, the control signal impressed on terminal 25 is insufficiently positive to overcome the positive voltage from potentiometer 42, 43 so that diode 34 conducts effectively connecting trap 33*c*, 33*e* to ground. At the same time, the AFC voltage impressed on terminal 53 is sufficiently negative to overcome the positive bias on the control grid 8 of tube 48, so that tube 48 is cut-off which, in turn, makes tube 39 non-conductive so that trap 33*a*, 33*d* is effective. During the reception of the monochrome television signal, the opposite situation exists and trap 33*a*, 33*d* is shorted due to the conduction of tubes 48 and 39; and trap 33*c*, 33*e* is disconnected from ground due to the blocking of diode 34. Therefore, the brightness amplifier efficiently traps the chroma subcarrier during color reception, and equally efficiently translates all the necessary video frequency components during monochrome reception.

Figure 4:
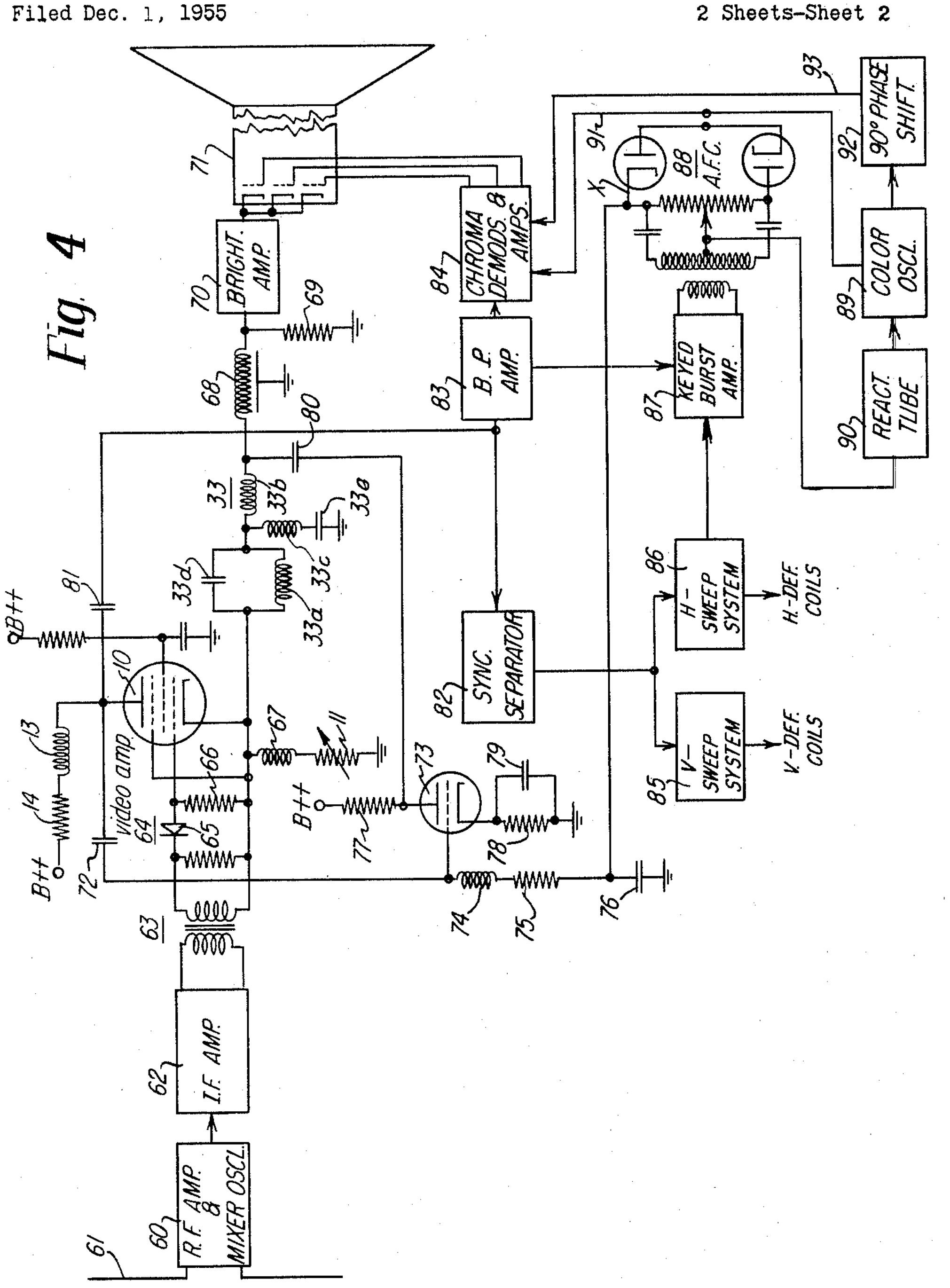
Fig. 4 shows a color television receiver, partly schematic, and incorporating an embodiment of the invention.

Fig. 4 shows the control circuit of the present invention as incorporated in a color television receiver. The receiver includes the usual tuner unit 60 including the radio frequency amplifier and mixer oscillator stages of the receiver. The input terminals of unit 60 are connected to an antenna 61, and the output terminals are connected to an intermediate frequency amplifier 62.

Intermediate frequency amplifier 62 is coupled through a transformer 63 to the second detector 64 of the receiver. This detector is connected in the manner described in copending application 372,547, filed August 5, 1953, in the name of Norman W. Parker and assigned to the present assignee. That is, the second detector 64 includes a rectifier 65 which is connected as a floating detector so that the various signals can be recovered from brightness amplifier 10 with the desired polarities. Rectifier 65 is connected to the control electrode of the brightness or video amplifier 10, and this electrode is connected to the cathode through a resistor 66. The cathode is connected to ground through a peaking coil 67 and through the variable contrast control resistor 11. In this embodiment, the M-derived filter 33 is connected to the cathode instead of to the anode of the amplifier tube. That is, the trap circuit 33*a*, 33*d* is connected to the cathode of device 10 and inductance coil 33*b* is connected to a usual brightness delay line 68, and the junction of coils 33*a* and 33*b* is connected to ground through the series resonant trap 33*c*, 33*e*.

Delay line 68 is terminated by a resistor 69 and is connected to a brightness amplifier 70. The brightness amplifier 70 is connected to the cathode of a cathode ray color image reproducing device 71 of, for example, the usual tri-gun type.

The anode of device 10 is coupled through a capacitor 72 to the control electrode of a triode 73, this control electrode being connected to ground through a choke coil 74, a resistor 75 and a by-pass capacitor 76, all these elements being series connected. The anode of triode 73 is connected through a load resistor 77 to the positive terminal B++, and the cathode is connected to ground through a resistor 78 shunted by a capacitor 79. The anode of device 73 is coupled through a capacitor 80 to the common junction of coil 33*b* and delay line 68.

The capacitor 72 and inductance coil 74 form a high-pass filter for feeding the high frequency amplified video signals from the anode of device 10 around the low-pass filter 33. Therefore, so long as triode 73 is nonconductive, only the video or brightness components up to the cut-off frequency of filter 33 are translated to the reproducing device 71. However, when device 73 is rendered conductive, the higher frequency components are additionally translated to the reproducer.

The anode of device 10 is coupled through a capacitor 81 to a usual sync separator 82 and chroma band-pass amplifier 83. The band-pass amplifier is connected to the chroma demodulators and amplifiers 84 which, in turn, are connected in known manner to the control electrodes of the color image reproducer 71. The sync separator 82 is connected to the vertical sweep system 85 and to the horizontal sweep system 86, and these sweep systems are connected to the respective deflection coils of reproducer 71.

Band-pass amplifier 83 and horizontal sweep system 86 are connected to a keyed burst amplifier 87 which selects the color synchronizing bursts from the received color television signal and impresses them on AFC circuit 88. Circuit 88 compares the output of the color oscillator 89 with the bursts from amplifier 87 to derive a control signal, which control signal is impressed on reactance tube 90 to control the color oscillator and maintain it in phase and frequency synchronism with the incoming television signal. The color oscillator supplies a continuous wave to the chroma demodulators over lead 91, and this wave is phase shifted 90° in a circuit 92 to supply a phase quadrature signal to the chroma demodulators over lead 93.

During the reception of a color television signal, this signal is intercepted by antenna 61, amplified and heterodyned to the selected intermediate frequency of the receiver in unit 60, and amplified in intermediate frequency amplifier 62. The amplified intermediate frequency signal is detected in detector 64 and amplified in device 10. The amplified detected signal from device 10 is impressed on band-pass amplifier 83 which selects the modulated chroma subcarrier and supplies it to the chroma demodulators in unit 84. The synchronizing components are separated from the detected signal in separator 82, and these components are supplied to the sweep systems 85 and 86 to synchronize these systems. The color synchronizing bursts are selected by the keyed amplifier 87, which is keyed by pulses from sweep system 86 that are timed relative to the horizontal sync to coincide with the color synchronizing bursts. These bursts are compared in the AFC circuit 88 with the output signal from the color oscillator, as previously noted, to develop a control signal and supply it to reactance tube 90 to synchronize color oscillator 89. The color oscillator supplies the required phase-quadrature demodulating signals on leads 91 and 93 in the manner described to enable the chroma demodulators to recover the three color-difference signals which are amplified and supplied to the control grids of reproducer 71. These color-difference signals are mixed in the color reproducer with the brightness signal impressed on its cathodes by amplifier 70 so that a color image may be produced on the screen of the reproducer.

The application of the bursts to the AFC circuit 88 causes a negative voltage of relatively high value to appear at point X and this voltage is impressed on the control grid of triode 73 to render that triode nonconductive. The filter 33, therefore, constitutes the sole signal path between amplifier 10 and amplifier 70 and this filter cuts off at the frequency of the chroma subcarrier. Therefore the chroma subcarrier with its side bands are not translated to the brightness amplifier 70 and the distorting effects thereof are prevented.

When a monochrome television signal is received, such signal is utilized in a manner similar to the utilization of the color television signal. However, the monochrome television signal has no chroma subcarrier or color synchronizing bursts. Therefore, no bursts are supplied to the AFC circuit 88 and the voltage at point X rises to a less negative value. This enables triode 73 to be conductive, so that the high frequency components of the composite video signal appearing at the anode of video amplifier 10 are translated around the low pass filter 33. This means that a composite video signal through a wider frequency range is supplied to amplifier 70 for increased definition for the black and white reproduction.

In a constructed embodiment of the invention, the following values were used for the circuit elements. These values are listed herein merely by way of example and are not intended to limit the invention in any way:

| | |
|---|---|
| Resistor **66** | 4700 ohms. |
| Coil **67** | 39 microhenrys. |
| Resistor **11** | 830 ohms. |
| Coil **33*a*** | 40 microhenrys. |
| Capacitor **33*d*** | 17 micromicrofarads. |
| Coil **33*c*** | 40 microhenrys. |
| Capacitor **33*e*** | 30 micromicrofarads. |
| Coil **33*b*** | 40 microhenrys. |
| Capacitor **80** | 10 micromicrofarads. |
| Delay line **68** | 1,000 ohms. |
| Resistor **69** | 1,000 ohms. |
| Low pass filter **33** | 1,000 ohms (M-derived, constant-K, $f_{co}$—3 mc.). |
| Capacitor **72** | 5 micromicrofarads. |
| Inductance coil **74** | 90 microhenrys. |
| Resistor **75** | 200 ohms. |
| Capacitor **76** | .01 microfarad. |
| Capacitor **79** | 10 microfarads. |
| Resistor **78** | 330 ohms. |
| Resistor **77** | 3300 ohms. |
| Devices **10** and **73** | 6AN8-pentode-triode. |

The invention provides, therefore, an improved television receiver that is capable of using both color and monochrome television signals, and which receiver is controlled for optimum reproduction of the monochrome television signal and for optimum reproduction of the color television signal without distortion from the chroma subcarrier.

I claim:

1. In a television receiver utilizing a color television signal and a monochrome television signal, wherein the color television signal includes brightness components extending through a first frequency range and a modulated chroma subcarrier in a second frequency range and the monochrome television signal includes brightness components extending through the first and second frequency ranges, and which receiver includes a color image reproducing device and a brightness channel for translating the brightness components of a television signal to the reproducing device; the combination of filter means coupled in the brightness channel and having a selected characteristic to pass the first and second frequency ranges, said filter means including a filter portion effective to reduce the band pass to translate the first frequency range and to reject the second frequency range, circuit means including an electron discharge device coupled to said filter portion and adapted to be cut off and rendered conductive for respectively operatively coupling said filter portion into said filter means and operatively disconnecting said filter portion from said filter means, further circuit means for producing a control signal having a first value during reception of the color television signal and having a second value during reception of the monochrome television signal, and means coupling said further circuit means to said electron discharge device to control the conduction thereof and reduce the band pass of said filter means to pass only the first frequency range during reception of a color television signal and to pass the first and second frequency ranges during reception of a monochrome television signal.

2. In a television receiver utilizing a color television signal and a monochrome television signal, wherein the color television signal includes brightness components extending through a first frequency range and a modulated chroma subcarrier in a second frequency range and the monochrome television signal includes brightness components extending through the first and second frequency ranges, and which receiver includes a color image reproducing device and a brightness channel for translating the brightness components of a television signal to the reproducing device; the combination of filter means coupled in the brightness channel and having a first band pass characteristic for translating through the brightness channel the first frequency range and rejecting the second frequency range and having a second bandpass characteristic for translating through the brightness channel the first and second frequency ranges, said filter means including control circuit means responsive to a control signal of a first value to establish the first characteristic and responsive to a control signal of a second value to establish the second characteristic, and further circuit means coupled to said control circuit means for producing a control signal of the first value during reception of the color television signal and a control signal of the second value during reception of the monochrome television signal for translating through the brightness channel only signals in the first frequency range upon reception of a color television signal and signals in the first and second frequency ranges upon reception of a monochrome television signal.

3. In a television receiver utilizing a color television signal and a monochrome television signal, wherein the color television signal includes brightness components extending through a first frequency range and a modulated chroma subcarrier in a second frequency range and the monochrome television signal includes brightness components extending through the first and second frequency ranges, and which receiver includes a color image reproducing device and a brightness channel for translating the brightness components of a television signal to the reproducing device: the combination of a first filter means series coupled in the brightness channel and having a selected characteristic to pass only the second frequency range, second filter means having a characteristic to pass only the first frequency range, circuit means including an electron discharge device coupling said second filter means across said first filter means, said electron discharge device being adapted to be cut off by a control signal of first value and to be rendered conductive by a control signal of second value, circuit means coupled to said electron discharge device and providing a control signal of the first value during reception of the color television signal and of the second value during reception of the monochrome television signal, for translating through the brightness channel only signals in the first frequency range on reception of a color television signal and signals in the first and second frequency ranges on reception of a monochrome television signal.

4. In a television receiver for selectively utilizing a monochrome television signal and a color television signal, the monochrome television signal including brightness components extending through a predetermined frequency range, and the color television signal including brightness components extending through at least a portion of said predetermined frequency range and further including a modulated chroma subcarrier of a selected frequency within said frequency range, said receiver including an amplifier for the brightness components of the monochrome television signal and for the brightness components and chroma subcarrier of the color television signal, and a cathode ray color image reproducing device; the combination of circuit means including a low-pass filter coupled to said amplifier for translating the brightness components of the color television signal to said reproducing device and providing a trap for the modulated chroma subcarrier during reception of the color television signal, a potential source producing a control potential having a first value during the reception of the color television signal and having a second value during the reception of the monochrome television signal, a high-pass filter network for translating signal frequencies above the cutoff frequency of said low-pass filter, and an electron discharge device responsive to said control potential for effectively connecting said high-pass filter network to the amplifier and the reproducing device during reception of said monochrome television signal and for effectively disconnecting said high-pass filter network from the reproducing device and amplifier during reception of the color television signal.

5. In a television receiver for selectively utilizing a monochrome television signal and a color television signal and applying the same to an image reproducer, the monochrome television signal including brightness components extending through a predetermined frequency range, and the color television signal including brightness components extending through at least a portion of said predetermined frequency range and further including a modulated chroma subcarrier of a selected frequency within said frequency range, the combination of circuit means for translating to the image reproducer the brightness components of the monochrome television signal and the brightness components of the color television signal and including a filter network portion for rejecting the modulated chroma subcarrier in translation of the image reproducer, a control source for producing a control signal having a first value during reception of the color television signal and having a second value during reception of the monochrome television signal, and control means responsive to said control signal for removing the effect of said filter network portion during reception of said monochrome television signal so that the brightness components of the monochrome television signal are translated to the image reproducer.

6. In a television receiver for selectively utilizing a monochrome television signal and a color television signal, the monochrome television signal including brightness components extending through a predetermined frequency range, and the color television signal including brightness components extending through at least a portion of said predetermined frequency range and further including a modulated chroma subcarrier of a selected frequency within said frequency range, the combination of amplifier means for translating the brightness components of the monochrome television signal and the brightness components of the color television signal, a filter network coupled to said amplifier means for trapping the modulated chroma subcarrier during reception of the color television signal, a control source for producing a control signal having a first value during reception of the color television signal and having a second value during reception of the monochrome television signal, and control means responsive to said control signal for effectively disconnecting said filter network from said amplifier means during reception of the monochrome television signal.

7. The combination defined in claim 6 in which said amplifier means includes an electron discharge device having a control electrode, and said filter network is series coupled with said control means between said control electrode and a point of reference potential.

8. In a television receiver for selectively utilizing a monochrome television signal and a color television signal, the monochrome television signal including brightness components extending through a predetermined frequency range, and the color television signal including brightness components extending through at least a portion of said predetermined frequency range and further including a modulated chroma subcarrier of a selected frequency within said frequency range, the combination of amplifier means for translating the brightness components of the monochrome television signal and the brightness components of the color television signal, said amplifier means including an electron discharge device having an anode electrode and a cathode electrode and a control electrode, a filter network coupled to one of said electrodes for rejecting the modulated chroma subcarrier during reception of the color television signal, a control source for providing a control signal having a first value during the reception of the color television signal and having a second value during the reception of the monochrome television signal, and control circuit means responsive to said control signal for removing the effect of said filter network during reception of the monochrome television signal.

9. In a television receiver for utilizing a monochrome television signal and a color television signal, the monochrome television signal including brightness components extending through a predetermined frequency range and the color television signal including brightness components extending through a portion of said predetermined range and further including a modulated chroma subcarrier within said frequency range, the combination of an image reproducing device, amplifier means for translating the brightness components of the monochrome and color television signals, said amplifier means including an electron discharge device having an input electrode and first and second output electrodes, means applying the brightness components to said input electrode, a first filter network coupled to said first output electrode and constructed to pass the brightness components of only the portion of said predetermined frequency range to said reproducing device, a second filter network constructed to pass signals of the frequency of the chroma subcarrier to the exclusion of the portion of said predetermined frequency range, circuit means including a further electron discharge device coupling said second filter network between said second output electrode and said image reproducing device, and further circuit means providing a cutoff control potential to said further electron discharge device during reception of the color television signal for excluding the modulated chroma subcarrier from the image reproducing device.

10. The combination defined in claim 8 in which said filter is an M-derived type and connected to said anode electrode.

References Cited in the file of this patent

UNITED STATES PATENTS 2,798,900 Bradley ---------------- July 9, 1957

FOREIGN PATENTS 1,062,916 France -------------- Apr. 28, 1954
155,397 Australia ------------- Feb. 24, 1954